(12) United States Patent
Lindenthal

(10) Patent No.: US 6,319,131 B1
(45) Date of Patent: Nov. 20, 2001

(54) ARTICULATED ARRANGEMENT FOR ARTICULATED SHAFTS SUITABLE FOR TRANSMITTING TORQUE

(75) Inventor: Hans Lindenthal, Heidenheim (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/509,399

(22) PCT Filed: Jul. 29, 1999

(86) PCT No.: PCT/EP99/05439

§ 371 Date: Apr. 12, 2000

§ 102(e) Date: Apr. 12, 2000

(87) PCT Pub. No.: WO00/06919

PCT Pub. Date: Feb. 10, 2000

(30) Foreign Application Priority Data

Jul. 30, 1998 (DE) .......................................... 298 13 550 U
Nov. 4, 1998 (DE) .............................................. 198 50 703

(51) Int. Cl.[7] ...................................................... F16D 3/41
(52) U.S. Cl. ............................................................ 464/132
(58) Field of Search ..................................... 464/132, 128, 464/130, 131, 905, 133, 134, 136

(56) References Cited

U.S. PATENT DOCUMENTS

| | | | |
|---|---|---|---|
| 1,899,840 | * | 2/1933 | Williams ............................... 464/130 |
| 1,943,814 | * | 1/1934 | Cutting ................................. 464/131 |
| 2,026,997 | | 1/1936 | Rice . |
| 2,040,002 | * | 5/1936 | Jones ................................... 464/132 |
| 3,005,324 | * | 10/1961 | Zeller ................................... 464/130 |
| 3,200,615 | * | 8/1965 | Stokely ................................. 464/130 |
| 3,204,428 | * | 9/1965 | Stokley ................................. 464/130 |
| 3,353,374 | * | 11/1967 | Buthenhoff ............................ 464/130 |
| 3,832,865 | * | 9/1974 | Lewis .................................... 464/132 |
| 4,144,724 | * | 3/1979 | Armasow et al. ..................... 464/130 |
| 4,705,490 | | 11/1987 | Lindenthal . |
| 4,710,150 | * | 12/1987 | Mangiavacchi ....................... 464/131 |
| 4,895,549 | * | 1/1990 | Lindenthal ............................ 464/136 |
| 5,547,423 | * | 8/1996 | Lindenthal et al. .................. 464/316 |
| 5,989,125 | | 11/1999 | Lindenthal . |

FOREIGN PATENT DOCUMENTS

| | | |
|---|---|---|
| 34 46 495 | 12/1986 | (DE) . |
| 35 44 253 | 6/1987 | (DE) . |
| 40 33 753 | 3/1992 | (DE) . |
| 195 29 980 | 3/1997 | (DE) . |
| 196 01 290 | 7/1997 | (DE) . |
| 1507-480 | 9/1978 | (SU) . |

OTHER PUBLICATIONS

"Bogenzahn–Kupplung mit Derhmomentbegrenzung", Antriebstechnik 23 (1984) No. 8, p. 32.

* cited by examiner

*Primary Examiner*—Lynne A. Browne
*Assistant Examiner*—Kenn Thompson
(74) *Attorney, Agent, or Firm*—Baker & Daniels (57) ABSTRACT

The invention relates to a joint arrangement for cardan waves adapted for the transmission of torque; with at least one joint fork; with journals borne in the fork eyes of the joint forks; the bearing arrangement of each journal comprises at least one radial bearing; to each bearing arrangement there is allocated a cover-form element subdividable into at least two partial zones of different dimensions, which cover-form element forms in the zone of at least one partial zone an axial stop for the seat of the inner ring of the radial bearing. The invention is characterized by the following feature: Means are provided which brace the cover-form element with respect to the journal, at least over a partial range of the other, second zone.

18 Claims, 7 Drawing Sheets

ARTICULATED ARRANGEMENT FOR ARTICULATED SHAFTS SUITABLE FOR TRANSMITTING TORQUE

The invention relates to a joint arrangement for the transmission of torque-suited cardan waves, in detail with the features from the generic term of claim 1.

Journal cross bearing arrangements for joint arrangements are known in various embodiments, for example, from the publications mentioned in the following:
1. DE 35 44 253 C1
2. DE 34 46 495 C2
3. SU 15 07 480 A1
4. DE 196 01 290 A1

The cross joint arrangement described in publication DE 196 01 290 A1 comprises a journal cross, two joint forks for the bearing of the journals of the journal cross, in which each journal of the journal cross is borne by means of a bearing arrangement comprising radial bearing with an outer ring and an inner ring and an axial bearing in a fork eye of the joint fork allocated to this. The inner ring of the radial bearing forms at least indirectly a running surface of the axial bearing. To the inner ring itself there is allocated a first outer collar in installation position in axial direction, which is directed toward the journal axis of the journal borne in the joint fork and which, at least indirectly, forms an axial stop for the seat of the inner ring in the face-side zone of the journal. The first outer collar allocated to the inner ring of the radial bearing is connectable by force fit and/or form fit with the journal borne in the joint fork and/or is supported in part on the journal borne in the joint fork. Further, to the inner ring as viewed in installation position in axial direction there is allocated a second further inner collar, which extends radially away from the journal axis of the journal borne in the joint fork. The inner collar of the inner ring forms, at least indirectly and in axial direction, the outer running surface of the axial bearing. The outer ring of the radial bearing presents in installation position and in axial direction, a first inner collar that extends in direction of the journal borne in the joint fork. The inner collar of the outer ring of the radial bearing forms, indirectly at least, the running surface of the axial bearing in axial direction. The outer ring has in installation position and in axial direction, a further second outer collar, to which there is allocated a stop in the fork eye. Thereby there is achieved an essentially elastic tying of the axial bearing, which can be arranged in the journal root zone. Further, the axial forces directed away from the joint axis in the direction of the journal axis are supported on the joint fork half which lies opposite the joint force half lying in force direction. The axial bearing, lying in the direction of effect of the axial force is then always unburdened. The axial forces, accordingly, are introduced as pressure force into the joint fork. There the blanks for the bearing rings of the radial bearing can be made thinner-walled, which results in a reduction of the weight. On the outer ring no threaded bores are any longer required. This leads to a higher sturdiness and is more economical. As a rule the outer collar allocated to the inner ring of the radial bearing is formed by a separate component. This separate component is executed in cover form and is connectable by means of at least one screw connection with the journal borne in the joint fork. Since the separate component with a part of its face surface facing the joint axis in installation position forms, at least indirectly and in axial direction, a stop for at least outer face surface of the inner ring of the radial bearing, this cover-form component is executed in step form and participates in the introduction of the axial forces over the fork into the radial/axial bearing.

Underlying the invention is the problem of further developing a bearing arrangement of the above-described type in such manner that the supporting of the axial forces and radial forces still can take place in a satisfactory manner.

The inventive solution of the problem is characterized by the features of claim 1. Advantageous developments are given in the subclaims.

According to the invention it is provided that to a joint arrangement for the transmission of torque with journals borne in the fork eyes of the joint forks, as well as a bearing arrangement for each journal, which comprises at least one radial bearing, and to each bearing arrangement there is allocated a cover-form element subdivided into at least two partial zones of different dimension, which cover-form element forms in the zone of at least one partial zone an axial stop for the seat of the inner ring of the radial bearing, means are allocated which tension the cover-form element at least over one partial zone of the other, second zone with respect to the journal. The cover-form element there takes over several functions; for one, the supporting of the axial forces as well as the supporting of radial forces. The tensioning serves for the axial connecting of the step plate to the journal cross. Relative movements of the individual elements of the bearing arrangements during the force transfer are thus further reduced.

The means for tensioning the cover-form element with respect to the journal can be executed as a compression joint. For the realization of the pressure connection there are a large number of possibilities:

Providing of a compression joint between at least one part of the second partial zone of the cover-form element and of the journal bore Providing of a means for the expanding at least of a part of the second partial zone of the cover-form element with respect to the journal bore Providing of an oil-pressure joint between at least one part of the second partial zone of the cover-form element and the journal execution of the press connection as a transverse press connection The concrete embodiment, and the selection of the possibility for the realization of the tensioning between cover plate and journal cross in axial and radial directions occurs in dependence on the concrete relations of the particular case and lies within the judgment of the specialist.

In executions for the realization of a tensioning between the cover-form element and the journal cross by means of a conical bolt which can be driven for the expansion into the cover-form body, there is preferably provided a twisting safeguard for the bolt-form element, in order under load to avoid an unburdening of the tensioning between cover-form element and journal cross. Preferably this bolt twisting safeguard is executed in the form of a yoke-shaped which engages on the bolt head and is secured to the screw connections for the fastening of the cover-form element to the journal cross. Other possibilities are likewise conceivable.

The inventive solution is explained in the following with the aid of figures. In these there is represented in detail the following.

Figure 1:
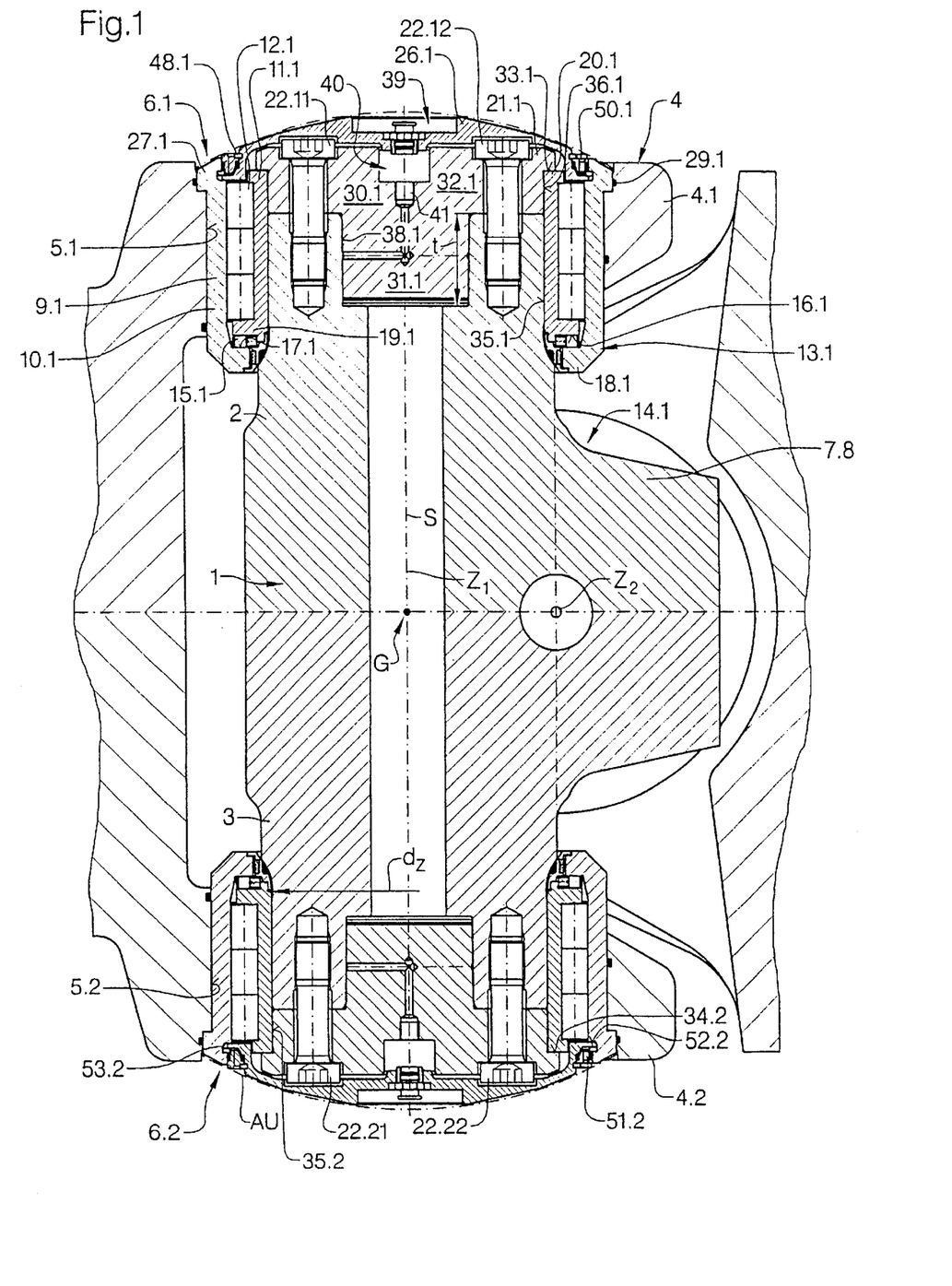
FIG. 1 illustrates schematically an embodiment of a joint arrangement according to the invention, especially of a universal joint arrangement in installation position in a section representation through a universal joint.

FIG. 1 illustrates schematically an embodiment of a joint arrangement according to the invention, in particular of a universal joint arrangement in installation position in a section representation through a universal joint in a plane laid through the journal axis and standing perpendicular to the joint axis plane in a view journal of a journal borne in the joint fork of a journal cross assembly. In this. In this figure there are represented in section, for the sake of illustration, journals borne in a joint fork and a third journal offset by 90* to the two journals, and journals borne in the other joint fork, in which, for reasons of simplification, the bearing for the journals borne in a joint fork is clarified. In the other figures, which represent further possibilities of execution, in the interest of simplification, in each case there is represented only one cut-out of a joint fork. For like elements there are used the same reference numbers.

A journal cross assembly 1 is borne with its journals 2 and 3 in a joint fork 4, comprising two joint fork halves—a first joint fork half 4.1 and a second joint fork half 4.2—in the zone of its bearing bores 5, here 5.1, by means in each case of a bearing arrangement 6, here 6.1. The journals 7 and 8, offset by 90 degrees relative to the journals 2 and 3 of the journal cross assembly 1 borne in the joint fork 4 of the journal cross assembly 1, are borne in a further join fork, not represented in detail here, comprising likewise two joint fork halves in the zone of their bearing borne, in each case, by a bearing arrangement. The joint fork 4 there, for example, is coupled with a machine part, not represented here, of the drive side and the joint fork, not represented in detail here, for the journals 7 and 8, is coupled with a machine part of the off-drive side. The journal axes Z1 and Z2 of the journal cross assembly 1, by which there are meant the axes through the journals 2 and 3, respectively 7 and 8, can be arranged there as represented in one plane or in two planes running parallel to one another, and offset to one another. The bearing arrangement 6.1 of the journal 2 comprises a radial bearing 9.1 with an outer ring 10.1, the rolling elements 12.1, and an inner ring 11.1 executed as a bearing sleeve. Further, there is provided an axial bearing 13.1 which is arranged, in the case represented, preferably, in the zone of the journal root, here the journal root 14.1.

The axial bearing 13.1 comprises at least the rolling elements 15.1. The rolling elements 15.1 are supported on a face surface 16.1 of the inner ring 11.1 of the radial bearing 9.1 directed toward the joint axis G—by which there is to be understood the axis through the section point of the journal axes Z1 and Z2 projected into a plane—and on a face plane 17.1 of the outer ring 10.1 of the radial bearing 9.1 directed away from the joint axis G. These face surfaces 16.1 and 17.1 are formed by the collars allocated to the running rings of the radial bearing 9.1 and they take over here the function of the outer and inner rings of the axial bearing. The outer ring 10.1 of the radial bearing 9.1 has for this a first inner collar 18.1 directed against the journal axis Z1. The inner ring 11.1 of the radial bearing 9.1 forms a constructive unit with a collar 19.1, which is designated as inner collar. There exists, however also the possibility, not represented here, of providing the axial bearing 13.1 with additional running rings (outer and inner ring), which are supported then on the face surfaces 16.1 and 17.1, respectively, of the collars, 18.1 and 19.1. The collars 18.1 and 19.1, as viewed in installation position proceeding in axial direction from the joint axis G, are preferably arranged lying inside, preferably in the zone of the journal root 14.1. Both running rings—outer ring 10.1 and inner ring 11.1 of the radial bearing 9.1, however, also as viewed in the zone of their outer ends in installation position in axial direction, proceeding from the joint fork axis G, in each case have a further second collar. To the inner ring 11.1 there is allocated an outer collar 20.1, here in the form of an annular projection formed on the running ring, or in the form of a separate component in the shape of a plate 21 constructed in cover form. The cover-shaped plate 21.1 is joined by means of screw connections 22.11 and 22.12 with the journal 2. Such an execution makes possible the obtaining of a stop for the inner ring 11.1 of the radial bearing 9.1 in axial direction. The inner ring 11.1, which can be executed as a bearing sleeve, is pressed on the journal 2.

The outer ring 10.1 of the radial bearing 9.1 is coupled with a bearing cover 26.1 allocated to each bearing bore 5.1. The bearing cover 26.1 there does not participate in the force transfer. The form-fit connection is realized in the zone of a second outer collar 27.1 of the outer ring 10.1 of the radial bearing. The collar 27.1 extends there in radial direction away from the journal axis Z1 and is extended in axial direction to the outside, i.e. in the direction parallel to the journal axis Z1. The form-fit connection between the outer ring 10.1 and the bearing cover 26.1 can be executed in various ways.

The outer ring 10.1 of the radial bearing is slidable along the journal axis Z1 in the direction of the joint axis G up to a stop 29.1 which is made in the joint fork 4.1, especially in the fork eye or in the bearing bore 5.1 respectively. This stop function as represented in FIG. 1, is achieved preferably by means of the collar 27.1 on the outer ring 10.1 of the radial bearing 9.1, which thereby comes to engage on the joint fork 4.1.

For the supporting of the radial forces a cover-form element 21.1 is provided. This has at least two partial zones of different dimensions, a first partial zone 30.1 and a second partial zone 31.1. In the case represented a further, third partial zone 32.2 is provided. The third partial zone 32.1 forms there the outer collar 20.1 for the inner ring 10.1 of the radial bearing 9.1. The inner ring 10.1 there of the radial bearing 9.1 is supported with its surface 33.1 directed away from the joint axis G, on the stop surface 34.1 formed by the third partial zone 32.1 in axial direction. Further, the inner surface 35.1 of the inner ring 10.1 of the radial bearing 9.1, in radial direction is supported on the outer surface 36.1 in the second partial zone 31.1 of the cover-form element 21.1. The second partial zone 31.1 of the cover-form element 21.1 has for this a diameter $d_{DE2}$ which corresponds to the diameter $d_z$ of the journal. The first zone of the cover-form element 21.1 extends over at least a part of the depth t of a journal bore 38.1. At least a part of the first partial zone 30.1 of the cover-form 21.1 is tensioned with respect to the journal bore 38.1 or of the journal 2, respectively. The tensioning occurs in the case represented over a so-called oil-press binding. For the obtaining of the oil-press binding corresponding means 39 are provided. These comprise at least one operating agent feed system 40. The operating agent feed system 40 comprises in turn in the case represented at least one central supply channel 41, which issues into corresponding distributing channels 42. This central supply channel 41 is in the case represented arranged preferably in the zone of the geometric symmetry line S of the journal 2 and therewith of the journal axis Z1, and it extends through the bearing cover 26.1 and the cover-form element 21.1. The radial forces are transferred there from the joint fork 4.1 over the outer ring 10.1 of the radial bearing 9.1 and the rolling elements 12.1 onto the inner ring 11.1 of the radial bearing 9.1 and from this over the cover-form element 21, here in particular the stop surface on the outer circumference 36.1 in the second zone 31.1 of the cover-form element 21.1, onto the journal bore 38 and therewith to the journal 2. The oil-press binding between the journal 2 and the cover-form element 21 does not serve here, as is usual, as connection of two components for the purpose of the transfer of torque, but in addition to the screw connections 22.11, 22.12 of the axial joining of the cover-form element 21.1 to the journal 2.

In the example of execution represented the cover-form element 21 and the rolling bearing inner ring 10.1 are formed by different components. The cover-form element 21 is executed as a step pulley in the form of a single component, but can also be of several parts. Further possible executions are represented in FIGS. 3 to 6. The axial forces arising through the transverse acceleration, which act in the direction of the journal axis Z1 away from the joint axis G, here in the direction of the joint fork half 4.2, lead to an unburdening of the axial bearing lying in this direction and to a loading of the axial bearing 13.1 lying in journal axis direction contrary to the acting direction of the axial forces on the side of the joint fork half 4.1. The unburdened bearing can be designated in this operating state as passive bearing and the loaded bearing can be designated as active bearing. In this execution an axial force acting away from the joint axis G in the direction of the journal axis Z1 brings about a suspension of the tension forces acting on the screw connections 22.21, 22.22 in this direction, and therewith an axial shifting of the corresponding collar of the radial bearing, whereby the axial bearing of the journal borne in the joint fork 4.2 is unburdened. No force transfer occurs over this axial bearing. Simultaneously the screws of the screw connection 22.11 and 22.12 on the oppositely lying joint fork half 4.1 are stressed more for tension. There occurs an addition of the tension force predominating in the screw connection 22.11, 22.12 and of the tension force acting on the journal 2, which leads to a pressure stressing of the collar 20.1 which is formed by the third partial zone 32.1 of the cover-form element 21.1 and therewith of the inner ring 11.1. The axial force is supported, therefore—over the outer collar 20.1 stressed for pressure, over the inner ring 11.1, the axial bearing 13.1 and the inner collar 19.1, over the outer ring 10.1 of the radial bearing 9.1—on the joint fork half 4.1, especially the recess 45.

Since the deformation of the torque-transferring components of a transverse journal joint in peripheral direction of the force can be so extreme that by reason of the bearing there can occur an uneven load distribution, and only a fraction of the possible carrying rating then can be utilized. The lacking plane parallelism of the axial bearing running paths 18.1 and 19.1 brings about a premature fatigue of the running paths and roller bodies, and/or plastic deformations with their consequences. On the other hand, the assured dynamic and static carrying ratings of the bearings are guaranteed by the bearing manufacturer only in a rigid bearing-connection construction. In order to ensure a plane parallel of the running courses of the axial bearing in the case of additionally acting peripheral force, in the solution the axial bearings 13.1 are arranged in such manner that the deformation occurs on both the collar elements 18.1 and 19.1 in like manner. This is achieved by the means that the possible lever arms, to which the axial bearing 13.1 or its running surfaces are exposed, are kept as low as possible. Preferably both collars are laid out in such manner that as equal as possible lever arms are present. In this case the parallelism of the running surfaces of the axial bearing 13.1 on load is obtained.

For the shielding of the radial bearing 9.1, between the bearing cover 26.1 and the outer collar 27.1 of the outer ring 10.1 of the radial bearing 9.1, there is provided a sealing carrier 50.1 in the form of a ring or of a plate, which is fixed in axial direction by means of securing elements, for example security rings 48.1, and is joined in form-fit manner with the bearing cover 26. In order to minimize a stressing of the bearing cover 26.1 in radial direction during the elastic deformation of the bearing bore 5.1 of the joint fork 4.1 under torsional load, and to achieve a form-fit connection 25.1 with the outer ring 10.1 of the radial bearing 9.1, the bearing cover 26.1 has in the zone of its outer periphery AU a cover edge 51.1 which in installation position extends in radial direction over a part of the width of the radial bearing 9.1, preferably so that this part of the outer periphery AU of the bearing cover 26 shields the radial bearing 9.1, especially the rolling elements 12.1 in axial direction. In installation position the cover edge 51.1 with a part of its inner surface 52.1 facing the joint axis G, lies on a partial surface 53.1 of a recess 54.1 provided for it on the outer collar 27.1 of the outer ring 10.1 of the radial bearing 9.1. The cover edge is in installation constructed elastically deformable in radial direction. The security ring 48.1 is then arranged between the cover edge 51.1 of the bearing cover 26 and the collar 27.1 and the sealing carrier 50.1. For the adaptation of the bearing cover to the deformations of the bearing bores this cover is coupled in such manner in closed form with the outer collar of the outer ring of the radial bearing that yieldings are possible on presence of elastic deformations of the cover edge.

Figure 2A:
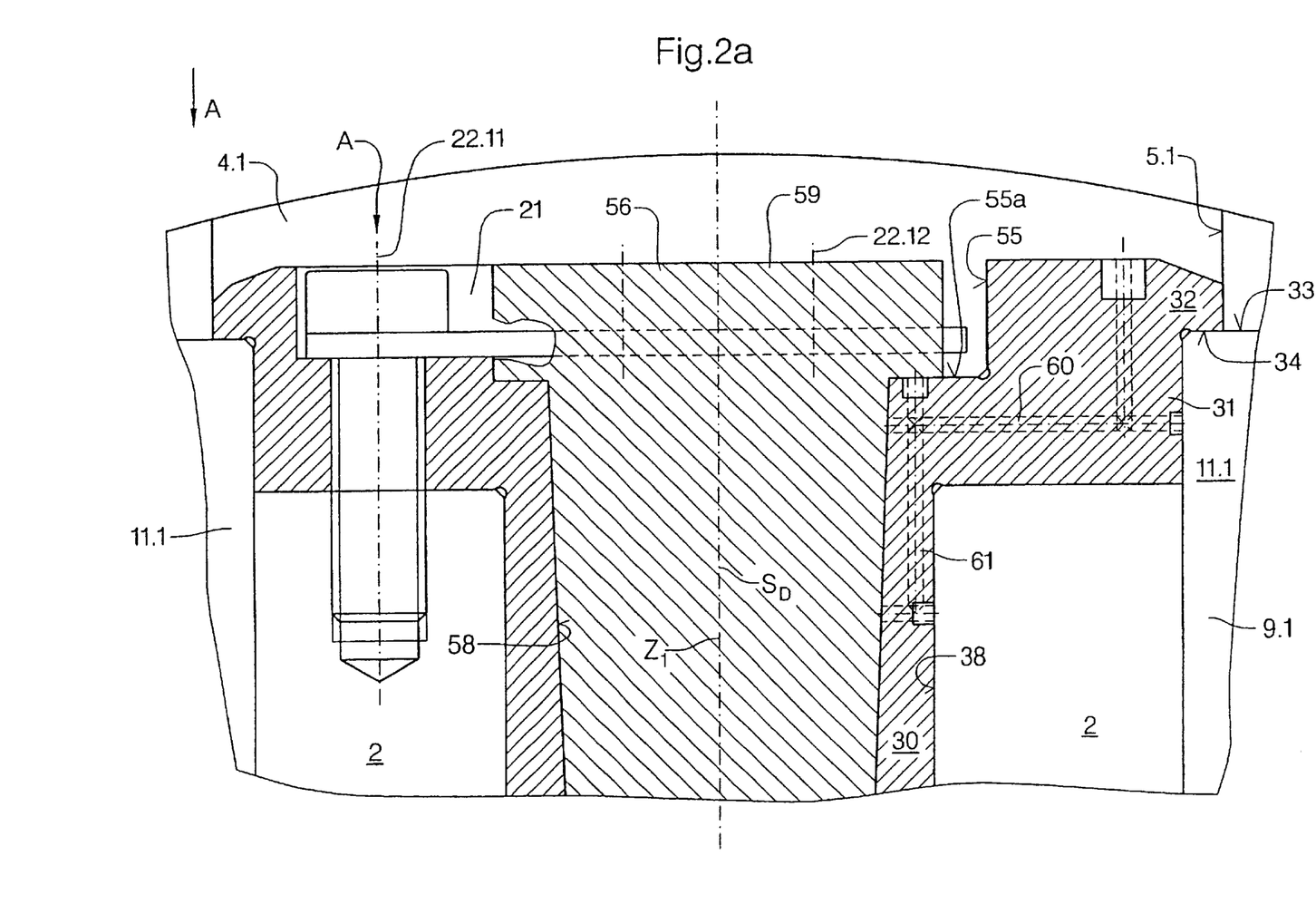
FIG. 2 illustrates a further possibility for the realization of the bracing between the cover-form element and the journal for an embodiment corresponding to FIG. 1.

FIG. 2 explains with the aid of a cut-out from a journal bearing in greatly simplified representation a further possibility for the achieving of the tensioning between a cover-form element 21 and the journal 2 for a form of execution corresponding to FIG. 1. For like elements, therefore, there are used the same reference numbers. FIG. 2a explains there a cut-out from a view that corresponds to FIG. 1. In this there are recognizable the journal 2 as well as the cover-form element 21. The cover-form element 21 is executed here, too, in the form of a step pulley and has at least three partial zones—a first partial zone 30 and a second partial zone 31 and a third partial zone 32. The third partial zone 32 forms there with its surface 34 directed toward the joint axis G a stop for the surface 33 on the inner ring 11.1 of the radial bearing 9.1. The first part 30 extends there into the journal bore 38. In the area of the second partial zone 31 or at least in the area of the third partial zone 32 there is present a recess 55 in the zone of the axis of symmetry $S_d$ of the cover-form element 21, which axis coincides in installation position with the journal axis Z1. The tensioning of the cover-form element 21 with respect to the journal bore 38 occurs here by corresponding means which make possible a widening of the cover-form element in the first partial zone 30. In the case represented there is used for this a conical bolt 56. This extends in installation position in the direction of the joint fork axis G, through the cover-form element 21, and on into the journal 2. The cover-form element 21 is formed, at least over a part of its first zone 30, in such manner that these and the journal bore 38 form a transition fit in this zone. For the bolt 56 for the widening the cover-form element 21 has at least one passage bore 58. This extends at least over the first and second zones and is enlarged in the third zone to form the recess 55. The recess 55 forms there a stop surface 55a for the head 59 of the bolt 56. The tensioning of the cover-form element 21 is achieved by the introduction of the bolt 56 into the cylindrical bore 58, in which the diameter of the cylindrical bore 58 corresponds at least to the smallest diameter of the conically formed bolt 56.

Also in this execution there are provided operating medium supply channels, here pressure-oil channels 60 and 61.

Figure 2B:
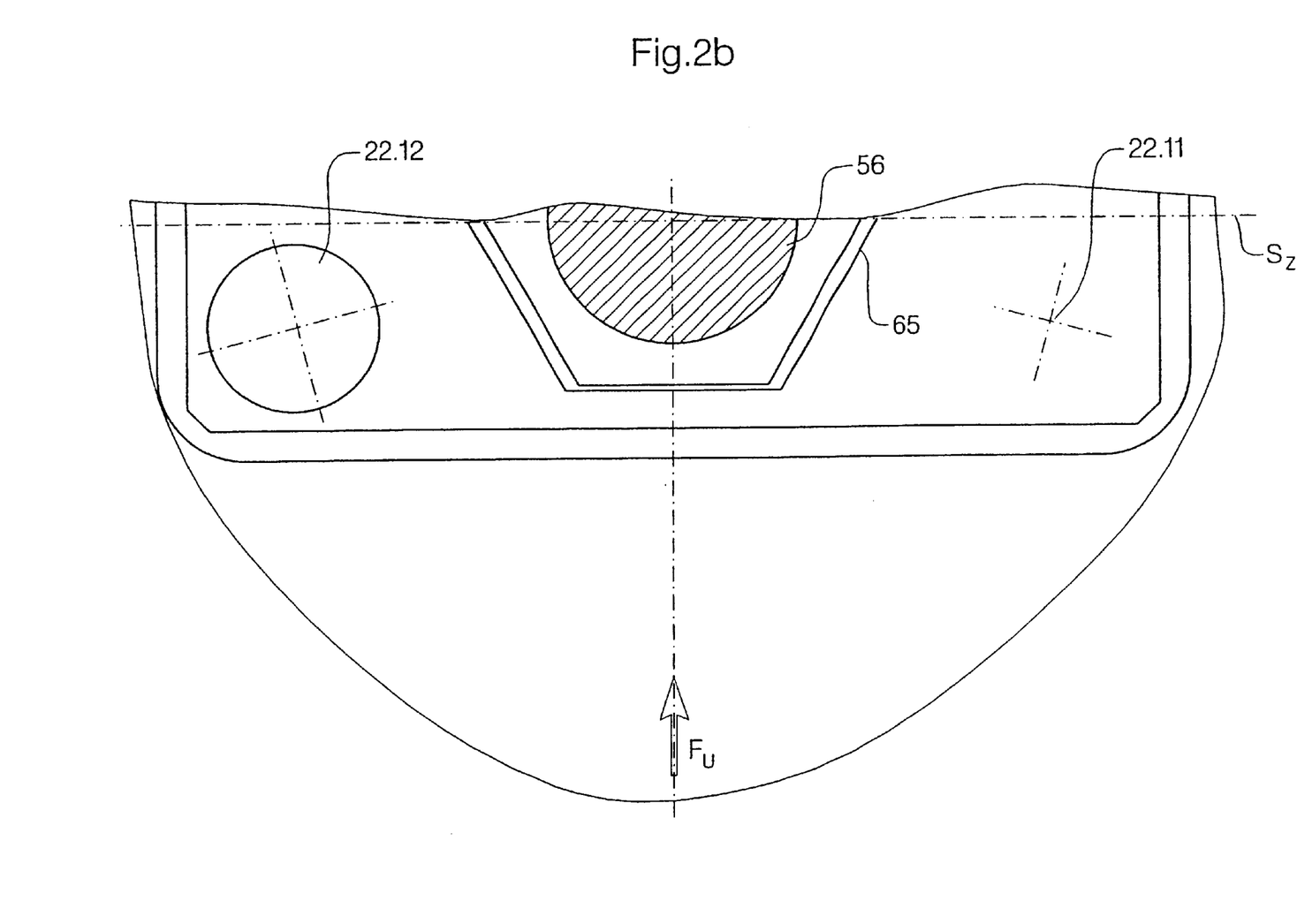

FIG. 2b explains a cut-out from a view A corresponding to FIG. 2a. From this it is evident that the bolt 56 is provided with a bolt-twisting safeguard 65. This is executed in the form of a sheet metal element which encloses the bolt head 56 as well as the screw elements 22.11 and 22.12. For the take-up of axial forces there are available, therefore, relatively large cross sections, especially the bolt cross section as well as the cross sections of the screw connections. The screw connections there are arranged in correspondence to the view A of FIG. 2a, essentially in the zone of the symmetry line $S_z$ of the journal 2. The highly stressed zone of the journal is free from threaded joints.

Figure 3:
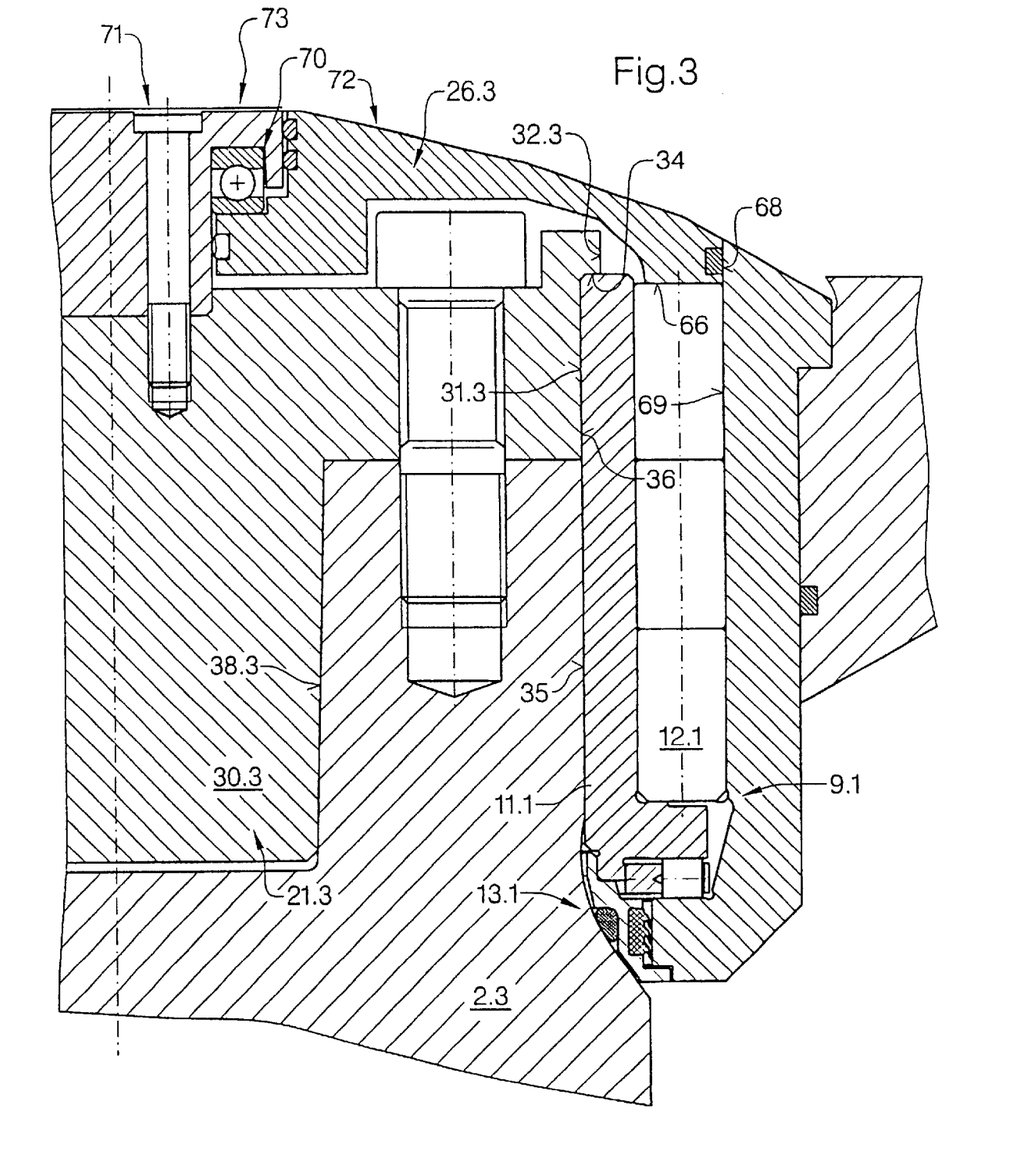
FIG. 3 illustrates a further embodiment of a cover-form element with conical formation.

FIG. 3 explains, with the aid of a cut-out from a bearing, a further execution of the cover-form element 21, here designated with 21.3, as it can be used for executions corresponding to FIG. 1a and FIG. 2a. For like elements corresponding to the executions of the other FIGS. 1 and 2, therefore, the same reference numbers are used. The cover-form element 21.3 here likewise comprises three partial zones, a first partial zone 30.3, a second partial zone 31.3 and a third partial zone 32.3. The third partial zone 32.3 serves there as axial stop for the inner ring 11.1 of the radial bearing 9.1. In radial direction the outer surface 36 in the second partial zone 31.3 forms a stop surface for the inner surface 35 of the inner ring 11.1 of the radial bearing 9.1. At least the first and the second zones are executed in the form of a step pulley, while the third zone 32.3 is executed as a collar extending in axial and radial directions.

The tension distribution between the cover-form element 21.3 and the journal bore 38.3 of the journal 2 can be carried out in various ways, for example as represented in FIG. 1. For this reason these possibilities will no longer be gone into here in detail. The first zone 30.3 of the cover-form element 21.3 in the represented case is formed conically. This means that the diameter in the first zone 30.3 decreases in the direction of the joint axis G.

In FIG. 3 there is represented, besides the force-closure tensioning between cover-form element 21.3 and journal cross 2.3, a further possibility for the formation of the bearing cover 26.3. This cover forms a stop for the rolling body 12.1 of the radial bearing 9.1. For this its surface 66 facing in the direction of the joint fork axis G is surface-treated in a corresponding manner so that the outer surfaces 67 of the rolling bodies 12.1 can slide along on this. The outer circumference of the bearing cover 26, here designated with 68, forms a stop surface which stands in contact with the execution extended in axial direction of the running surface 69 on the outer ring 11.1 of the radial bearing 9.1. The bearing cover 26.3 is force-closable over the screw connection 71 coupled with the cover-form element 21.3. The bearing cover 26.3 comprises at least two single elements, a first single element 72 and a second single element 73, which are coupled with one another over a bearing arrangement 70. This bearing arrangement is executed as a fixed-bearing arrangement, so that both radial and also axial forces can be transmitted with respect to the installation position of the bearing and the arrangement of the running rings.

This execution, too, presents a simple and very compact bearing arrangement for a joint arrangement.

Figure 4:
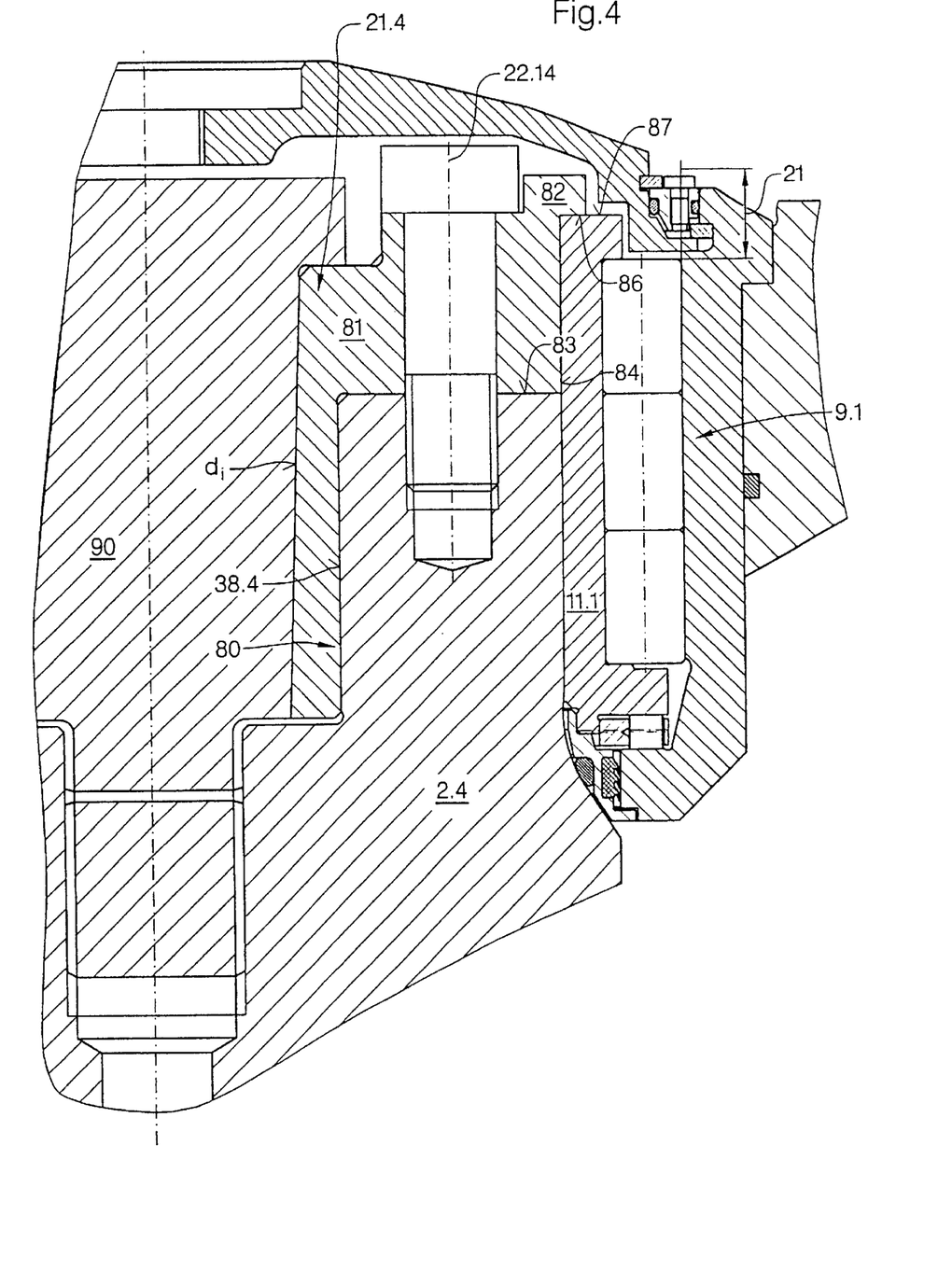
FIGS. 4 to 6 illustrate further embodiments of the cover-form element.
Figure 5:
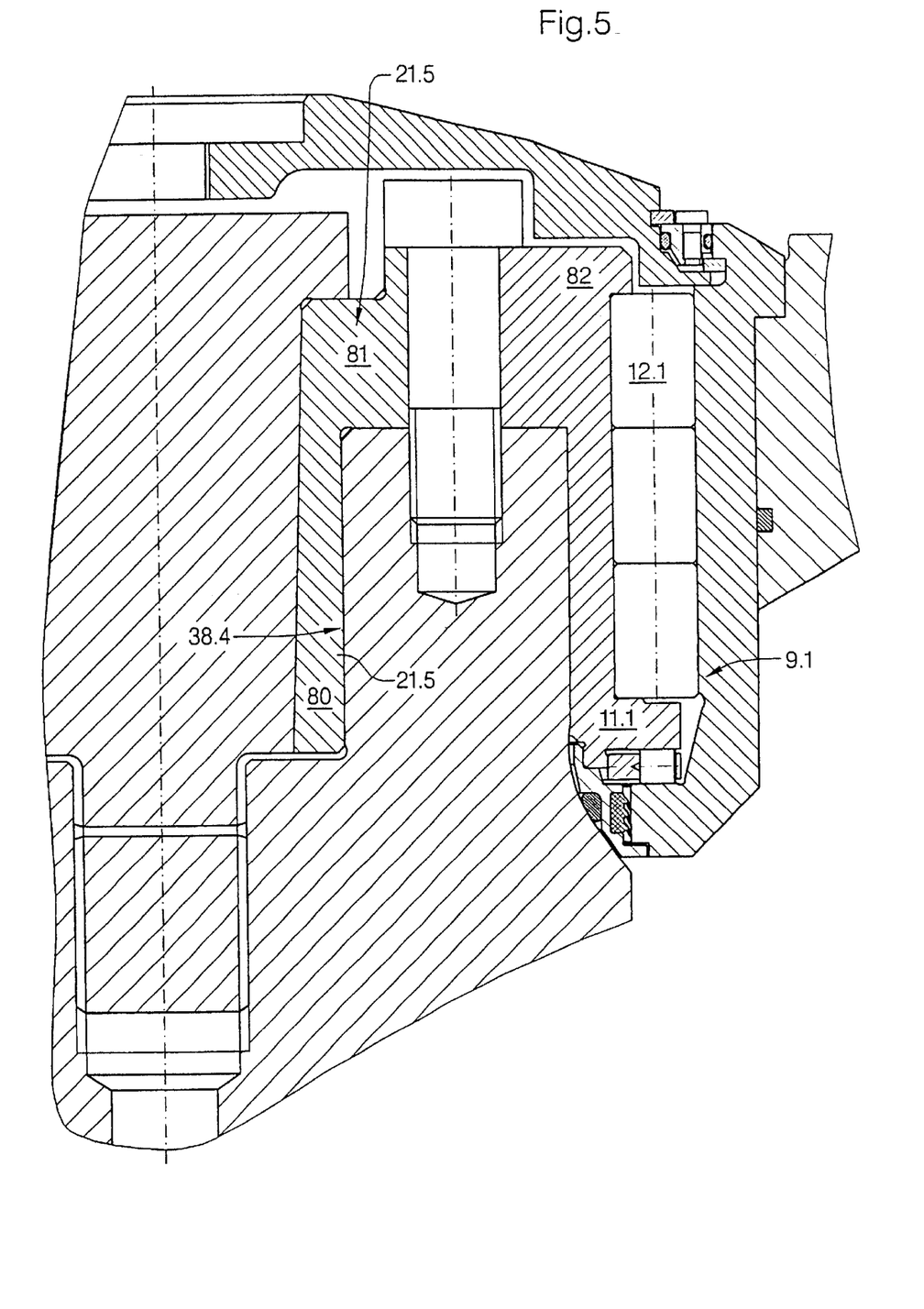
Figure 6:
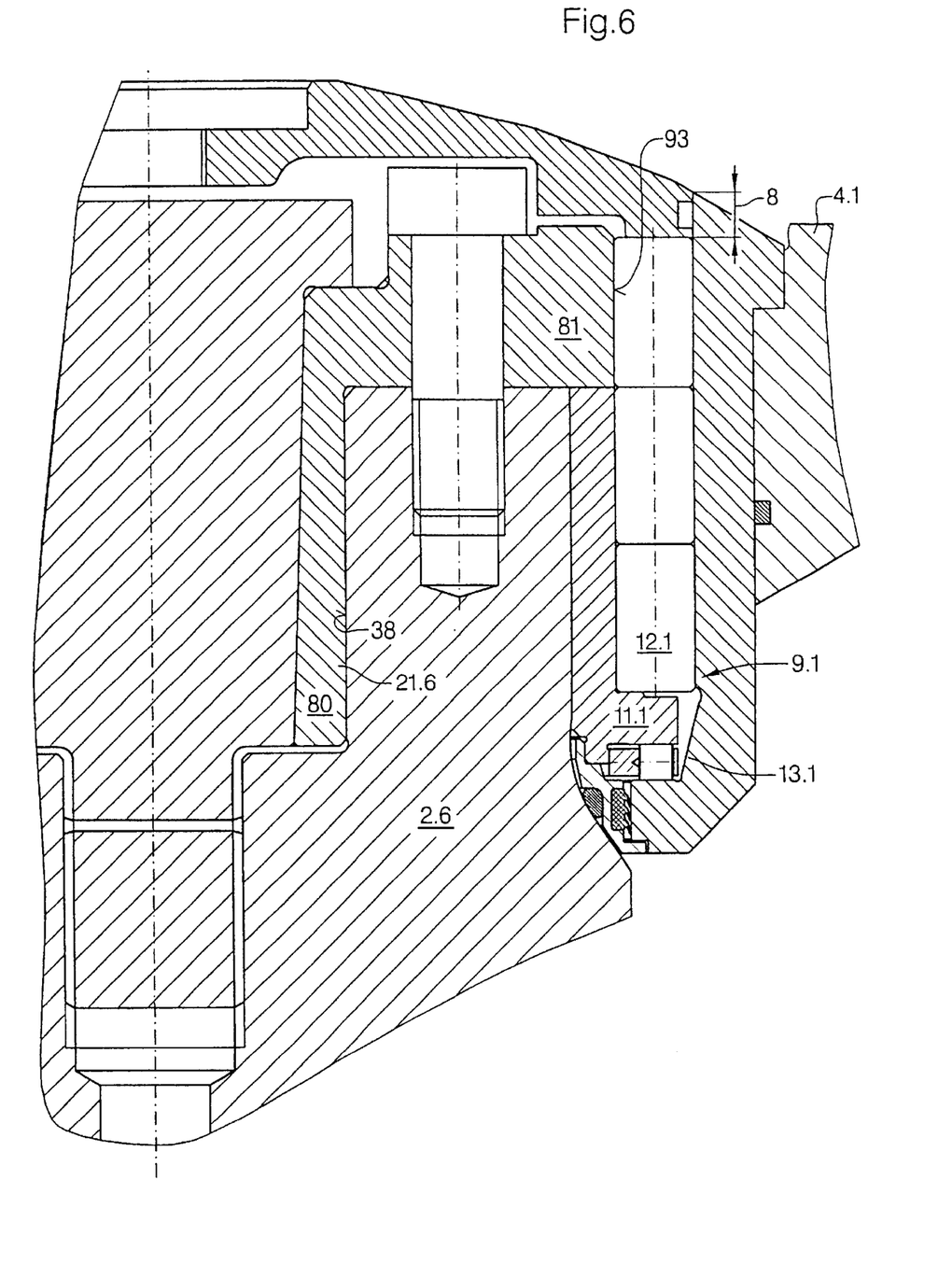

FIGS. 4 to 6 explain further embodiments for achieving the tensioning between the cover-form element and the journal 2, in which the bearings of the bearing cover correspond to those in FIGS. 1 to 3; only the execution of the cover-form element is different. The cover-form element 21.4 comprises in the example represented three cylindrical zones which are comprehended into one component. The three zones, here a first zone 80, a second zone 81 and a third zone 82, have in each case different wall thicknesses in radial direction. The first partial zone extends, there, essentially from the face surface 83 of the journal over a certain distance, into a journal bore 38.4. The second zone forms with its outer circumference 84 a stop surface for the inner ring 11.1 of the radial bearing 9.1. The third zone 82 forms in axial direction, with its face surface 86 directed toward the joint fork axis G, a stop for the face surface 87 of the inner ring 11.1 of the radial bearing 9.1 facing away from the joint force axis G. The second zone 81 of the cover-form element 21.4 is reinforced and serves also for the reception of the screw connections 22.14 and 22.24, respectively. In the execution represented the cover-form element 21.4 has no constant inside diameter over the axial extent, essentially in the second and in the third zones. The diameter decreases in the direction of the joint fork axis G in installation position. Into the cover-form element 21.4 a bolt-form element 90 can be introduced, which likewise has essentially a conical cross section and serves for the expanding of the cover-form element 21.4 at least over a partial zone of the first zone 80.

The inner ring of the radial bearing 11.1 and of the outer collar allocated to this, which is formed by the second and third partial zones of the cover-form element, here designated with 81 and 82, are obtained by different components. FIG. 5 explains an execution in which the cover-form element is formed analogously as in FIG. 4, but the inner ring 11.1 of the radial bearing 9.1 forms a component with the cover-form element 21.5. The cover-form element here is executed accordingly in the form of a cylindrical element with turned-up edge.

The outer surface of the cover-form element, here designated with 91, must there be surface-treated in order to be able to serve as running surface for the rolling elements 12.1 of the radial bearing 9.1.

FIG. 6 clarifies a further execution of the cover-form element, in which its outer circumference, in the second partial zone 81, here designated with 93, forms the running surface for the rolling elements of the radial bearing 9.1.

What is claimed is:

1. Joint arrangement for the transmission of torque-adapted cardan waves;
    with at least one joint fork;
    with journals borne in the fork eyes of the joint forks;
    the bearing arrangement of each journal comprises at least one radial bearing;
    to each bearing arrangement there is allocated a cover-form element subdividable into at least two partial zones, which forms in the area of at least one partial zone of the cover-form element an axial stop for the seating of the inner ring of the radial bearing, whereby the inner radial bearing running surface is supported by said cover-form element in an axial direction;
    characterized by the following feature:
    means are provided which tension the cover-form element at least over a partial area of the other, second zone with respect to the journal, said means comprising an oil-press joint located between at least a part of the second partial zone of the cover-form element and the journal.

2. Joint arrangement according to claim 1, characterized in that the journal in installation position has at least one journal bore on its face side directed toward the joint fork axis.

3. Joint arrangement according to claim 2, characterized in that the journal bore is executed in cylindrical form.

4. Joint arrangement according to claim 2, characterized in that the journal bore is at least partially executed in conical form at least over a partial area of its extent in the direction of the joint fork axis.

5. Joint arrangement according to claim 2, characterized in that said oil-press joint is located between at least one part of the second partial zone of the cover-form element and the journal bore.

6. Joint arrangement according to claim 2, characterized in that the tensioning means comprises a means for the expanding of at least a part of the second partial zone of the cover-form element with respect to the journal bore.

7. Joint arrangement according to claim 6, characterized in that the means for the expansion is formed by a bolt-form element.

8. Joint arrangement according to claim 7, characterized in that to the bolt-form element there is allocated a twist safeguard.

9. Joint arrangement according to claim 1, characterized in that the oil-press joint is located between at least a part of the second partial zone of the cover-form element and the journal.

10. Joint arrangement according to claim 1, characterized in that said oil press joint is provided between the cover-form element and the radial bearing running surface.

11. Joint arrangement according to claim 6, characterized in that the oil-press joint is executed as a transverse pressing connection.

12. Joint arrangement according to claim 1, characterized in that the cover-form element is executed as a step level with at least two dividing plates of different diameter.

13. Joint arrangement according to claim 1, characterized in that the cover-form element comprises at least two cylindrical bodies of different wall thickness, which form a constructive unit.

14. Joint arrangement according to claim 1, characterized in that the bearing arrangement comprises an axial bearing.

15. Joint arrangement according to claim 14, characterized in that the axial bearing is arranged in the zone of the journal root.

16. Joint arrangement according to claim 15, characterized by the following features:
   the inner ring of the radial bearing forms, in installation position in axial direction, a first outer running surface of the axial bearing.

17. Joint arrangement for the transmission of torque-adapted cardan waves;
   with at least one joint fork;
   with journals borne in the fork eyes of the joint forks;
   the bearing arrangement of each journal comprises at least one radial bearing and an axial bearing;
   to each bearing arrangement there is allocated a cover-form element subdividable into at least two partial zones, which forms in the area of at least one partial zone of the cover-form element an axial stop for the seating of the inner ring of the radial bearing;
   means are provided which tension the cover-form element at least over a partial area of the other, second zone with respect to the journal;
   characterized in that the axial bearing, opposite the radially outward-directed collar of the inner ring of the radial bearing and the radially inward-directed collar of the outer ring of the radial bearing, is executed in such manner that the collars have like leverage relative to the position of the rolling elements of the axial bearing.

18. Joint arrangement according to claim 17, characterized in that the line of symmetry S of the rolling elements of the axial bearing is arranged in installation position in axial direction in the zone of the line of symmetry of the rolling elements of the radial bearing that run in axial direction.

* * * * *